United States Patent
Deo et al.

(10) Patent No.: US 11,492,538 B2
(45) Date of Patent: Nov. 8, 2022

(54) SCALE INHIBITION USING STAR POLYMERS

(71) Applicants: DOW GLOBAL TECHNOLOGIES LLC, Midland, MI (US); ROHM AND HAAS COMPANY, Collegeville, PA (US); THE REGENTS OF THE UNIVERSITY OF CALIFORNIA, Oakland, CA (US)

(72) Inventors: Puspendu Deo, Lake Jackson, TX (US); Antony K. Van Dyk, Collegeville, PA (US); Paul Clark, Midland, MI (US); David Lunn, Oxfordshire (GB); Craig Hawker, Santa Barbara, CA (US); Maria Simon, Lake Jackson, TX (US); Sungbaek Seo, Gyeongsangnam-do (KR); Alaina McGrath, Santa Barbara, CA (US)

(73) Assignees: DOW GLOBAL TECHNOLOGIES LLC, Midland, MI (US); ROHM AND HAAS COMPANY, Collegeville, PA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/425,745

(22) PCT Filed: Jan. 28, 2020

(86) PCT No.: PCT/US2020/015388
§ 371 (c)(1),
(2) Date: Jul. 26, 2021

(87) PCT Pub. No.: WO2020/159972
PCT Pub. Date: Aug. 6, 2020

(65) Prior Publication Data
US 2022/0162495 A1     May 26, 2022

Related U.S. Application Data

(60) Provisional application No. 62/797,622, filed on Jan. 28, 2019.

(51) Int. Cl.
*E21B 37/06* (2006.01)
*C09K 8/528* (2006.01)

(52) U.S. Cl.
CPC .............. *C09K 8/528* (2013.01); *E21B 37/06* (2013.01)

(58) Field of Classification Search
CPC .......... C09K 8/528; C09K 8/54; C09K 8/524; C09K 8/536; C09K 8/52; C09K 2208/20; C09K 2208/32; E21B 37/06; E21B 41/02
See application file for complete search history.

(56) References Cited

U.S. PATENT DOCUMENTS

| 3,463,730 A * | 8/1969 | Booth ........................ B01J 2/30 510/253 |
| 5,032,646 A | 7/1991 | Walinsky |
| 2002/0115798 A1 | 8/2002 | Narayan-Sarathy et al. |
| 2008/0058229 A1* | 3/2008 | Berkland ................. C09K 8/60 507/211 |
| 2008/0114128 A1 | 5/2008 | Destarac et al. |
| 2018/0244552 A1 | 8/2018 | Reyes et al. |

FOREIGN PATENT DOCUMENTS

| EP | 2604636 A1 | 6/2013 |
| WO | 2014121188 A1 | 8/2014 |
| WO | 2017048234 A1 | 3/2017 |

OTHER PUBLICATIONS

Amer Badr Bin Merdhah et al., "Barium Sulfate Formation in Oil Reservoir During Water Injection at High-Barium Formation Water", Journal of Applied Sciences, vol. 7, No. 17, 2007; pp. 2393-2403.
Amjad, Z. et al., "The Science and Technology of Industrial Water Treatment", CRC Press; 532 pages.
Amjad, Z. et al., "Water Treater Deposit Control Polymer Evaluation Criteria and Considerations", Association of Water Technologies, 2012; 16 pages.
Brown, A. D. F. et al. , "Coil-Tubing Milling/Underreaming of Barium Sulphate Scale and Scale Control in the Fortied Field", Society of Petroleum Engineers (SPE 23106), 1991; 17 pages.
Burdynska, J. et al., "Synthesis of Star Polymers Using ARGET ATRP", Macromolecules, vol. 43, 2010; pp. 9227-9229.
Buss, B. L., et al., "Synthesis of start polymers using organocatalyzed atom transfer radical polymerization through a core-first approach", Polymer Chemistry, vol. 9, 2018; pp. 1658-1665.
Gao, H. et al., "Synthesis of Miktoarm Star Polymers via ATRP Using the "In-Out" Method: Determination of Initiation Efficiency of Star Macroinitiators", Macromolecules, vol. 39, 2006, pp. 7216-7223.
Hasson, D. et al., "State of the Art of Friendly "Green" Scale Control Inhibitors: A Review Article", Industrial & Engineering Chemistry Research, vol. 50, 2011; pp. 7601-7607.
International Search Report for the corresponding International Application No. PCT/US2020/015388; Date of Filing: Jan. 28, 2020; dated May 15, 2020; 6 pages.
Kubotera, A. et al., "Synthesis of well-defined 3-arm and 6-arm poly(acrylic acid)s via ATRP of methyl acrylate and hydrolyses of 3-arm and 6-arm poly(methyl acrylate)s", Polymer Journal, vol. 48, 2016; pp. 611-619.

(Continued)

*Primary Examiner* — Zakiya W Bates
(74) *Attorney, Agent, or Firm* — Cantor Colburn LLP

(57) ABSTRACT

A method for inhibiting scale comprises adding to a fluid that causes scale formation a polycarboxylic acid or a salt thereof which has a star structure and at least 5 arms. A star polymer comprising a core based on 2,2'-[Oxybis(methylene)]bis[2-(hydroxymethyl)-1,3-propanediol] and 6 arms comprising linear polycarboxylic acids of degree of polymerization (DP) of the arm of at least 2 and in some embodiments up to 15 or more is useful in inhibiting scale formation.

19 Claims, 2 Drawing Sheets

(56) References Cited

OTHER PUBLICATIONS

Ma, S. et al., "Preparation of a phosphorous-free terpolymer as a dcalcifying agent for removing calcium from crude oil", RCS Advances, vol. 6, 2016; pp. 58426-58433.
Mitchell, R. W. et al., "Chemical Treatments Associated With North Sea Projects", Journal of Petroleum Technology, May 1980; pp. 904-912.
Written Opinion for the corresponding International Application No. PCT/US2020/015388; Date of Filing: Jan. 28, 2020; dated May 15, 2020; 8 pages.
Zhang, W. et al., "Rapid and Efficient Anionic Synthesis of Well-Defined Eight-Arm Star Polymers Using OctavinylPOSS and Poly(styryl)lithium", Macromolecules, vol. 45, 2012; pp. 8571-8579.
Zhang, X. et al., "End-Functional Poly(tert-butyl acrylate) Star Polymers by Controlled Radical Polymerization", Macromolecules, vol. 33, 2000; pp. 2340-2345.

Sheikhi, A. et al., "Macromolecule-based platforms for developing tailor-made formulations for scale inhibition", Environmental Science: Water Research and Technology, vol. 2, 2016; pp. 71-84.
Antony, A. et al., "Scale formation and control in high pressure membrane water treatment systems: A review", Journal of Membrane Science, vol. 383, 2011; pp. 1-16.
De Wispelaere, M.: "Early Condensate in a Fossil Power Plant using organic treatment", 14th International Conference on the Properties of Water and Steam in Kyoto, 2004; 4 pages.
Quan, Zhenhua et al., "Experimental study on scale inhibition performance of a green scale inhibitor polyaspartic acid", Science in China Series B: Chemistry, vol. 51, No. 7, Jul. 2008; pp. 695-699.
Ross, R. J. et al., "Polyaspartate Scale Inhibitors—Biodegradable Alternatives to Polyacrylates", The NACE International Annual Conference and Exposition, paper No. 162, 1996; 12 pages.
Schweinsberg, M. et al., "New Stable Biodegradable Scale Inhibitor Formulations for Cooling Water: Development and Field Tests", 64th Int. Water Conf., Pittsburgh, 2003; 13 pages.

\* cited by examiner

SCALE INHIBITION USING STAR POLYMERS

CROSS-REFERENCE TO RELATED APPLICATIONS

This application is a National Stage application of PCT/US2020/015388, filed Jan. 28, 2020, which claims benefit of U.S. Application No. 62/797,622 filed on Jan. 28, 2019, both of which are incorporated by reference herein in their entirety.

FIELD OF THE INVENTION

The field of this invention is a method for inhibiting scale formation using polyacrylic acid polymers.

BACKGROUND

The accumulation of unwanted deposits (mineral scales, corrosive products, etc.) occurs in the majority of industrial processes where equipment surfaces are in contact with untreated water. These deposit build-ups can cause operational problems, such as blocking of pipes and pumps, increased running costs, and ultimately equipment failure.

For example, in oilfield applications precipitation of inorganic salts, such as calcium carbonate, calcium sulfate, barium sulfate or strontium sulfate, from aqueous fluids to form scale is a persistent and common problem during operations to recover hydrocarbons from subterranean formations. Water flooding is the most widely used technique to recover oil from oil-bearing subterranean formations. The technique involves injecting water into the formation to drive oil therein toward a production system composed of one or more wells through which the oil is recovered. The injection water may be produced water or seawater. Seawater, which is readily available in offshore operations, is typically used for the injection water in the water flooding operation. Seawater contains large amounts of dissolved salts such as sulfate. Therefore, sulfate scales are formed when seawater is mixed with formation water. The carbonate scales are primarily generated in the near wellbore/wellbore region due to the pressure drop. Carbon dioxide is frequently introduced into the formations during enhanced oil recovery operations, resulting in absorption of carbon dioxide into aqueous fluids. As aqueous fluids enter the wellbore during production, a reduction in pressure causes the absorbed carbon dioxide to flash out of the aqueous fluids to gas phase. This increases the pH of aqueous fluids and causes growth of carbonate scales in the near wellbore/wellbore region. Furthermore, water encountered in oilfield operations contains low solubility salts. Under certain conditions, these sparingly soluble salts may precipitate out of water resulting in scale formation on various surfaces of the oil recovery system such as walls of pipework, heat exchanger surfaces, valves, and vessels. The scale can block the perforations in the casing, production tubing, downhole pumps and the formation in either the production well or injection wells. Additionally, scale can block the near wellbore region matrix permeability and micro fissures. Scale formation affects heat transfer, interferes with fluid flow, facilitates corrosion and harbors bacteria. In oilfield piping and tubing, scale can cause restriction to flow and high friction loss. Furthermore, the oil production rate declines steadily as the scale forms. To restore the oil production rate, various methods have been used.

In other industrial applications, the emphasis placed on water conservation has made it necessary for industrial water systems to operate at higher concentrations and for extended periods, increasing the potential for deposit accumulation. As a result of this, there is still a significant commercial demand for new and improved additives to control scaling, corrosion, and biofouling.

Polymers derived from ethylenically unsaturated carboxylic acids (e.g. polyacrylic acids) or their salts are one class of scale inhibitors that are used in industrial applications, including oilfield applications, where equipment is subject to fouling from scale growth. For example, U.S. Pat. No. 5,032,646A discloses copolymers of methacrylic acid and itaconic acid for scale inhibition.

There remains a desire for new scale inhibitors, particularly those that are effective at lower application levels.

SUMMARY OF THE INVENTION

The present inventors have found that use of a star structure polycarboxylic acid provides remarkably enhanced scale inhibition as compared to linear polymers of the same polycarboxylic acid.

Thus, disclosed herein is a method for inhibiting scale comprising, adding to a fluid that causes scale formation, a scale inhibitor selected from the group consisting of polycarboxylic acids having a star structure and at least 5 arms, salts of such polycarboxylic acids, or combinations thereof.

Also, disclosed is a specific star polymer useful in scale inhibition which comprises a core based on 2,2'-[Oxybis(methylene)]bis[2-(hydroxymethyl)-1,3-propanediol] and 6 arms comprising linear polycarboxylic acids of degree of polymerization (DP) of the arm of at least 2 and in some embodiments up to 15 or more.

DETAILED DESCRIPTION OF THE INVENTION

Figure 1:
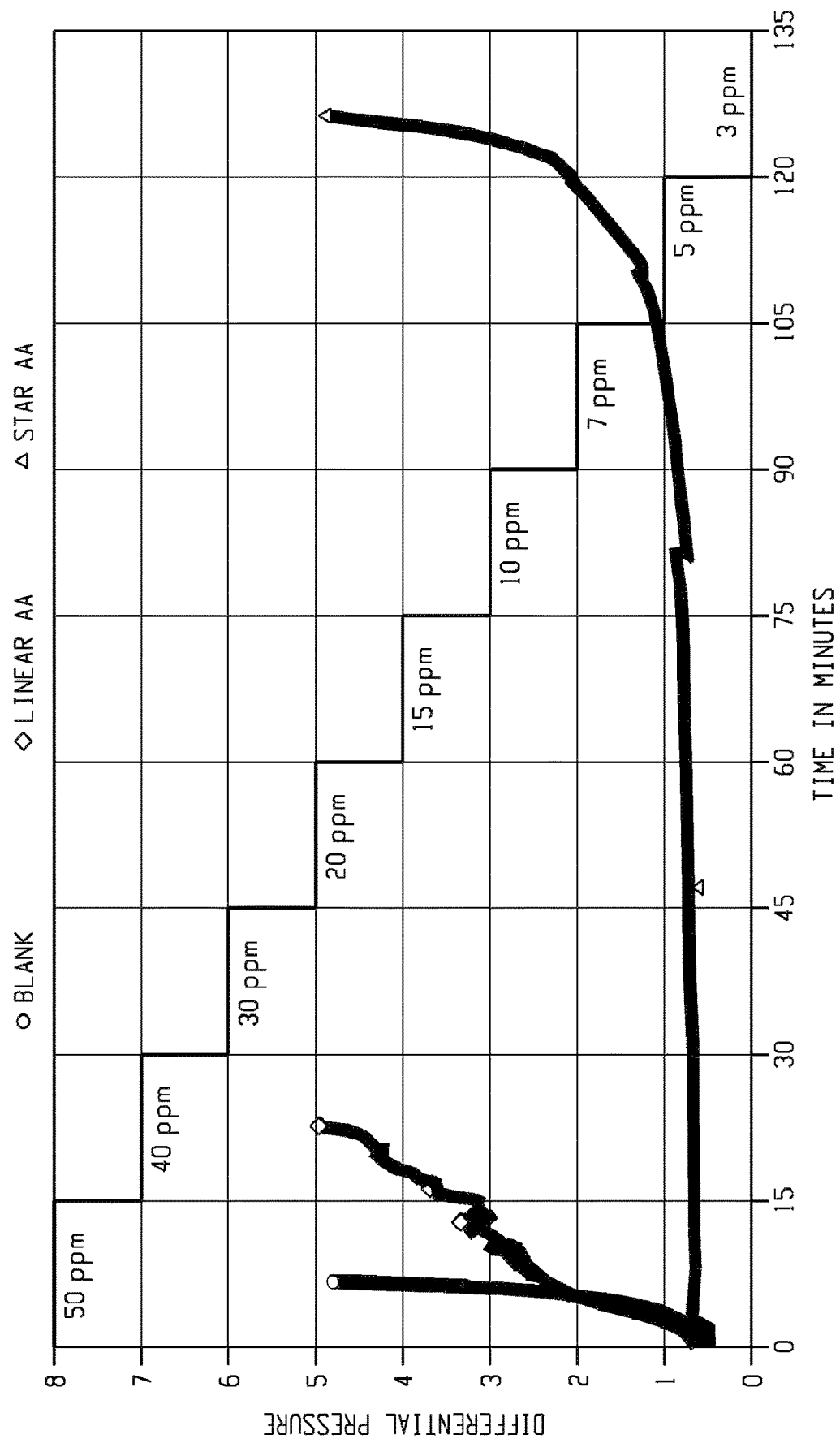
FIG. 1 is a graph showing the dynamic tube block test results for two comparative examples and for a star polymer as disclosed herein for standard Forties water.

The star polycarboxylic acids useful in the disclosed method are addition polymers of one or more ethylenically unsaturated monomers wherein said ethylenically unsaturated monomers comprise carboxylic acid-functional ethylenically unsaturated monomers, $R(COOH)_x$ where x is 1, 2 or 3 and R is an ethylenically unsaturated hydrocarbyl group, salts of such acids (e.g. $R(COOM)x$, where R and x are as defined and M is a metal ion), protected ethylenically unsaturated monomers of such acids (e.g. $R(COOR')_x$ where R and x are as defined above and R' is a hydrocarbon group of 1 to 8 carbon atoms). R can be an alkenyl group having at least 2 carbon atoms. R can be an alkenyl group having no more than 10, no more than 9, no more than 8, no more than 7, no more than 6, or no more than 5 carbon atoms. R' can bean alkyl group of 1, 2, 3, 4, 5, or 6 carbon atoms. The carboxylic acid-functional ethylenically unsaturated monomer can be, for example, acrylic acid, methacrylic acid, butenoic acid, crotonic acid, itaconic acid, an itaconic acid monoester, fumaric acid, a fumaric acid monoester, maleic acid, a maleic acid monoester, or salts thereof such as sodium or potassium salts thereof or a combination comprising at least one of the foregoing carboxylic acid-functional ethylenically unsaturated monomers (and/or their salts). Alternatively the star polycarboxylic acid can be an addition polymer of a carboxylic acid anhydride-functional ethylenically unsaturated monomer, in which the carboxylic acid anhydride functionality can be converted to carboxylic acid functionality, for example itaconic anhydride and maleic anhydride. The carboxylic acid-functional ethylenically unsaturated monomer can be (meth)acrylic acid, i.e. acrylic acid, methacrylic acid, or a combination thereof. Thus in some embodiments, the star polycarboxylic acid or salt thereof of is derived from polymerization of (meth)acrylic acid, for example it can be a polyacrylic acid (PAA) or a polymethacrylic acid (PMAA).

A used herein a "salt" can be an alkali metal salt, an alkaline earth metal salt, an ammonium salt, or a quaternary ammonium salt. The salt can be, for example, a lithium salt, a potassium salt, or an ammonium salt. In some embodiments, the salt is a sodium salt.

The star polymers can begin with a core structure or initiator having at least 5 locations where arms or branches can be added. For example the core structure can be a hexakis bromomethyl benzene. A novel core initiator structure could be 2,2'-[Oxybis(methylene)]bis[2-(hydroxymethyl)-1,3-propanediol]

The star polymer structures can be made by controlled radical polymerization as demonstrated in the Examples below. As another example, atom transfer radical polymerization can be used as taught in "Synthesis of 3-arm and 6-arm PMAs via ATRP and their hydrolyses" by A Kubotera and R Saito, in Polymer Journal (2016) 48, 611-619.

The arms of star structure polycarboxylic acid can all formed from the same monomer. The arms can be free of heteroatoms (i.e. atoms other than C, H, and O). Alternatively, more than one carboxylic acid-functional ethylenically unsaturated monomer could be used to form arms that are copolymers. The arms can be formed from the monomers set forth above or a second monomer could be a functionalized monomer, for example an ionic monomer. Examples of ionic monomers include a sulfonic acid-functional monomer, a phosphoric acid-functional monomer, a phosphonic acid-functional monomer, or a salt thereof. Examples of sulfonic-acid functional monomers include 2-sulfoethyl (meth)acrylate, 3-sulfopropyl (meth)acrylate, styrene sulfonic acid, vinyl sulfonic acid, and 2-(meth) acrylamide-2-methyl propanesulfonic acid. Examples of phosphoric acid-functional monomers include 2-phosphoethyl (meth)acrylate, 2-phosphopropyl (meth)acrylate, 3-phosphopropyl (meth)acrylate, phosphobutyl (meth)acrylate, and 3-phospho-2-hydroxypropyl (meth)acrylate. The phosphoric acid-functional monomer can also be a phosphoric acid ester of an alkoxylated hydroxyalkyl (meth) acrylate, for example a hydroxyethyl or hydroxypropyl (meth)acrylate ethoxylate or propoxylate having 1 to 50 ethoxy or propoxy repeat units. The ionic monomer can also be 2-(N,N-dimethylamino)ethyl (meth)acrylate.

The functionalized ethylenically unsaturated monomer can be a nonionic monomer. The nonionic monomer can be a hydrophilic non-ionic ethylenically unsaturated monomer, for example hydroxyethyl (meth)acrylate, hydroxypropyl (meth)acrylate, polyethylene glycol (meth)acrylate, or (meth)acrylamide. The nonionic monomer can also be a hydrophobic non-ionic monomer, for example an alkyl ester of (meth)acrylic acid, such as methyl (meth)acrylate, ethyl (meth)acrylate, butyl (meth)acrylate, 2-ethylhexyl (meth) acrylate, decyl (meth)acrylate, isodecyl (meth)acrylate, and lauryl (meth)acrylate. The nonionic monomer can also be styrene, or a substituted styrene such as α-methyl styrene, an α-olefin such as ethylene, propylene, 1-decene, and diisobutylene, or butadiene. The nonionic monomer can also be a vinyl monomer such as acrylonitrile, vinyl chloride, vinyl acetate, vinyl butyrate, or a vinyl ester of a branched, tertiary-alkyl alcohol, sold under the tradename VeoVa™, for example VeoVa™ 9 Monomer, VeoVa™ 10 Monomer, VeoVa™ 11 Monomer, available from Momentive Specialty Chemicals. In some embodiments, the polycarboxylic acid is derived from copolymerization of (meth)acrylic acid with at least one other (meth)acrylic or vinyl monomer.

The polycarboxylic acid or salt thereof can be a combination of the acid and the salt. In addition, some of the —(C=O)O— groups can be protected and be in a neutral form. For example, the protected monomer can be a t-butyl acrylate (TBA). For example, when making the star polymers, one can synthesize the start structure using for example TBA and then hydrolyze to form the acid. However, there may be some residual unhydrolyzed groups such that the polycarboxylic acid includes groups protected in a neutral form (e.g. instead of H or M there is a hydrocarbyl group such as an aryl group or alkyl group, particularly an alkyl group of 1, 2, 3, 4, 5, or 6 carbon atoms. The polycarboxylic acid (or salt) can be characterized in that at least 50, at least 60, at least 70, at least 80, or at least 90% of the —(C=O)O— groups are present in acid and/or salt form.

The polycarboxylic acid can have has at least 5 arms. The polycarboxylic acid can have no more than 10 arms. According to certain embodiments, the polycarboxylic acid has 6, 7, 8, or 9 arms. The average degree of polymerization of the arms can be at least 2, at least 3, or at least 4. The average degree of polymerization of the arms can be no more than 15, no more than 12, no more than 10, no more than 8, or no more than 6. The average degree of the arms means the average number of mer units (repeat units) in each arm of the star structure. According to certain embodiments, the arms have the same degree of polymerization or substantially the same degree of polymerization (e.g. each arm has plus or minus 2 or plus or minus 1 from the degree of polymerization of the other arms or from the average degree of polymerization). Overall, the polycarboxylic acid can have a degree of polymerization of at least 10, at least 15, at least 20, or at least 25 and no more than 200, no more than 150, no more than 100, no more than 75, or no more than 50. In the alternative, the polycarboxylic acid can have a number-average molecular weight of at least 500, at least 700, at least 1000, at least 1200, at least 1500, or at least 2000 g/mol. The number average molecular weight can be no more than 100,000, no more than 50,000, no more than 30,000, no more than 20,000, no more than 15,000, no more than 10,000, no more than 8000, or no more than 6000 g/mol. For lower molecular weight species, e.g. species with molecular weights of less than 10000 g/mol it can be useful to measure the molecular weight by nuclear magnetic resonance (NMR) spectra. For example, on a Varian 400, 500 or 600 MHz spectrometer 1H NMR chemical shifts (δ) are reported in parts per million (ppm), and measured relative to the signals for residual chloroform (7.26 ppm) or methanol (3.31 ppm) in the deuterated chloroform and deuterated methanol, respectively. Alternatively, particularly for higher molecular weight materials (greater than 10000 size exclusion chromatography may be used relative to a linear polystyrene/polymethyl methacrylate standard. For example SEC can be performed on a Waters 2690 separation module equipped with Waters 2414 refractive index and 2996 photodiode array detectors using CHCl3 containing 0.25% triethylamine as eluent at a flow rate of 1 mL/min. Mass spectrometry was performed on a Waters GCT Premier time-of-flight mass spectrometer (EI and FD). Polydispersity is a measure of the width of a molecular weight distribution, and is defined as the ratio of weight-average molecular weight to number-average molecular weight. In some embodiments, the star polycarboxylic acid or salt thereof, has a polydispersity of less than or equal to 2.5. Within this range, the polydispersity can be less than or equal to 2.0, less than or equal to 1.5, less than or equal to 1.4, less than or equal to 1.3, or less than or equal to 1.2.

For example, the star polycarboxylic acid can be initially formed as an acrylic acid tert butyl ester which is then hydrolyzed or partially hydrolyzed to form the polyacrylic acid or salt thereof. For example these polyacrylic acids or salts thereof may have a degree of polymerization in the range of 15 to 60 with a number of arms in the range of 5 to 10 and an average degree of polymerization in the arms of from 3 to 6.

The star polycarboxylic acid was found by the present inventors to be effective in much smaller amounts than a linear polymer of the same monomers. The star polycarboxylic acid can be used and has been found effective to treat fluids for sulfate scales such as Barium Sulfate or carbonate scales such as calcium carbonate.

The amount of the star carboxylic acid added to the fluid to be treated can be less than or up to 200, less than or up to 100, less than or up to 80, less than or up to 70, less than or up to 60, less than or up to 50, less than or up to 40, less than or up to 30, less than or up to 20, or less than or up to 10 parts per million (ppm) based on total weight of the fluid. The amount of star carboxylic acid added to the fluid can be at least 1, at least 2, at least 3, at least 4, or at least 5 ppm.

The fluid to be treated may be fluids is pipelines, horizontal wells, well walls, waste water or the like. The scale inhibition composition may be introduced by capillary injection and/or squeeze treatment. The star polycarboxylic acid polymers have found to be surprisingly effective in preventing scale, particularly, scale from multivalent ions such as Ba++.

EXAMPLES

Dynamic Scale Loop Test

The differential dynamic scale loop (DSL) is a tube blocking system to examine the precipitation and deposition of scale and other salt crystals in pipe work systems like oil or water pipelines. A DSL instrument from PSL Systemtechnik or similar device can be used to evaluate the scale precipitation and deposition under pipeline and reservoir conditions. The apparatus determine the efficiency of chemical inhibitors against inorganic mineral scales formed through the minimum inhibitor concentration (MIC), hence the MIC is necessary to perform comparative purpose for different scale inhibitors. The DSL technique used the tube blocking test as an industry standard to determine the MIC in dynamic reservoir conditions. Inhibitor efficiency can be calculated as the ratio between the times needed to tube blocking in the presence of inhibitor divided by the time needed to tube blocking in absence of inhibitor.

A benefit of dynamic tube blocking experiments compared to static one is the wide range of pressure and temperature in order to simulate real downhole production conditions. Performance of the scale inhibitors in dynamic flowing conditions was evaluated with the help of a dynamic tube blocking apparatus.

The tests can be performed at temperature of 100° C., pressure of 250 psi with calcium, strontium and barium as cations solution and sulfate and bicarbonate as anion solution. The solutions are filtered, preheated through coils and pumped at combined flow rate of 10 mL/min.

In a typical experiment, the scaling blank time is first determined. The blank time is the time required to observe an increase in differential pressure due to scale build up (from 0 to 5 psi differential pressure) without the addition of scale inhibitor. The scale inhibitor performance is then evaluated by repeating the test at different dose rates of scale inhibitor, for each dose rate, the test is allowed to proceed for twice the blank time. A "Pass" for a specific dose rate is given if the increase in differential pressure is not reached 5. The scale inhibitor dose is reduced and the test is continued. The test is stopped when the differential pressure is reached 5 at times shorter than the required time to step down the scale inhibitor dose. The Minimum Inhibitor Concentration (MIC) required to control scale is defined as the lowest dose rate at which the "Pass" criterion was met (i.e.: lowest scale inhibitor concentration that did not allow the differential pressure to reach 5 for a time equal or larger than double the blank time).

Example 1—Synthesis of the Star Polymer

Poly(TBA) star-polymers: In a reaction vial, a suspension of $CuBr_2$ (0.30 eq. or 0.05 eq. per initiating site, 58 mg, 0.028 mmol) and Tris[2-(dimethylamino)ethyl]amine ($Me_6TREN$) (1.08 eq. or 0.18 eq. per initiating site, 0.25 mL, 0.94 mmol) in a 4:1 mixture of toluene:TFE (9 mL) is sonicated to aid the dissolution of $CuBr_2$. Subsequently, tert-butyl acrylate (TBA) (30 eq. or 5 eq. per initiating site, 3.8 g, 26 mmol) and ethyl α-bromoisobutyrate (EBiB) (1 eq. equivalent to 6 initiating sites, 1.0 g, 0.87 mmol) are added. Finally, an acid etched copper wire (5 cm) wrapped around a magnetic stir bar is also added to the reaction vessel. The mixture is degassed with argon for 30 min, then left stirring at room temperature overnight. The polymerization is quenched by exposure to air. The solution us diluted with $CHCl_3$, filtered over neutral alumina, then concentrated over reduced pressure. The crude polymer was purified by column chromatography over silica gel with 75:25 ($Hex:Et_2O$) ($KMnO_4$ stain to visualize monomer) followed by 25:75 ($Hex:Et_2O$) to isolate the pure star polymers (Mn, NMR=5, 500 g·mol−1, Đ=1.05) in 95% yield.

Hydrogen-terminated poly(TBA) star-polymers: Bromine-terminated poly(TBA) (TBA-Br) (Mn, NMR=5,500 g·mol−1, Đ=1.05) (1 eq. or 6 Br-chain ends, 20 g, 3.6 mmol) and triethylamine (12 eq. or 2 eq. per Br-chain end, 7.2 mL, 51 mmol) were dissolved in THF (640 mL) followed by addition of 10 wt % palladium on carbon (1.5 eq. or 0.25 eq. per Br-chain end, 0.68 g, 6.4 mmol). The reaction mixture was then bubbled with hydrogen gas using a balloon connected to a needle with needle outlet (21 gauge) for 30 min. The balloon needle was then moved from the solution to the headspace, and the vent needle was removed. The reaction mixture was vigorously stirred overnight under a hydrogen atmosphere. The reaction mixture was then purged with argon to evacuate the hydrogen gas and was filtered through a short column of Celite™ diatomaceous earth from Sigma Aldrich, then neutral alumina. This mixture was concentrated in vacuo then analyzed by size exclusion chromatography to reveal some pronounced star-star coupling which was separated by column chromatography on silica gel with a gradient of Hex:E$_{r2}$O (90:5 to 65:45) to afford the pure hydrogen-terminated poly(TBA) star polymers (Mn, NMR=5,300 g·mol−1, polydispersity, Đ, =1.04) (90% yield).

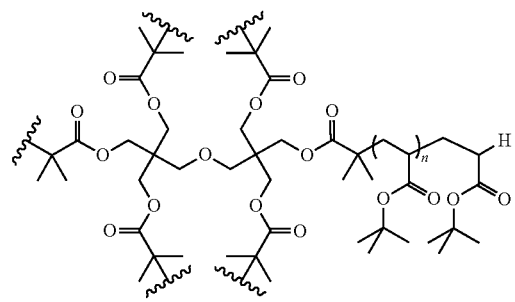

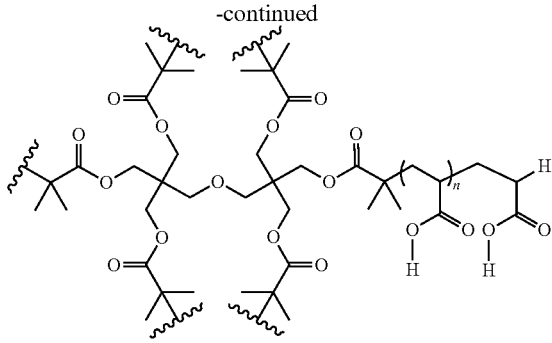

Poly(AA) star polymers: The hydrogen-terminated poly(TBA) star polymer (Mn, NMR=5,300 g·mol−1, Đ=1.04) (1 g) was dissolved in excess neat TFA (10 mL) and stirred overnight at room temperature. TFA was removed under reduced pressure. The crude material was dissolved in THF and precipitated in cold hexanes to give the poly(AA) star as a white solid in a quantitative yield (>99%).

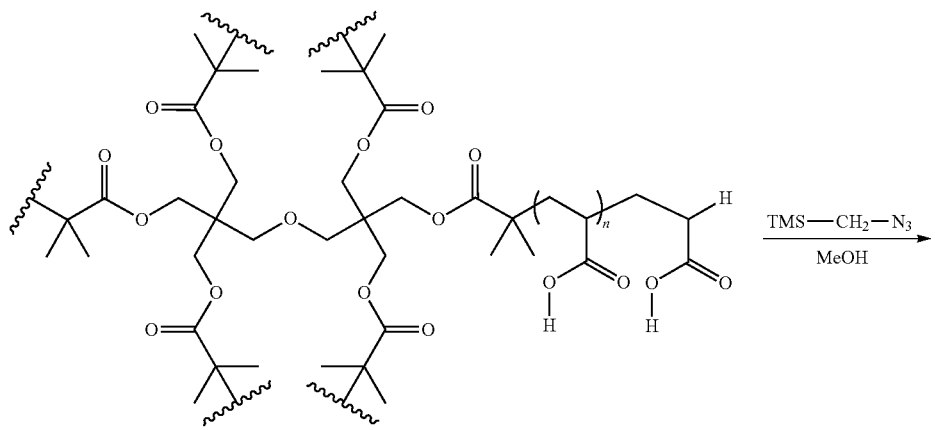

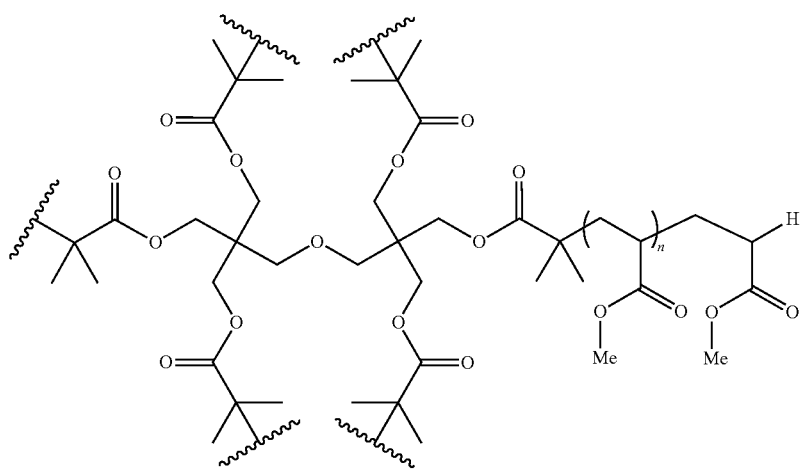

Poly(MA) star-polymers: Excess (trimethylsilyl)diazomethane (TMSCHN2) was added to a solution of the hydrogen-terminated poly(AA) star-polymer (0.10 g) (until yellow color persists) in MeOH at 0° C. The reaction mixture was stirred for an additional 10 min at this temperature then left overnight at room temperature. It was quenched with HOAc and concentrated under reduced pressure to afford the poly(MA) star-polymer (Mn, NMR=3,900 g·mol−1, Đ=1.05) as a white solid in good yield (95%). 6 arms each of DP 6 by NMR.

Example 2—Inhibition of BaSO$_4$ Scale

The test inhibitors are compared regarding their ability to prevent scale formation and adherence at the following application conditions: coil length of 1 m, coil internal diameter (ID) of 0.75 mm. Preferred concentration of scale inhibitors were prepared with anionic fraction of the solution and injected separately from cation and anion solution at the desired flow rate. Scale inhibitor concentration was decreased stepwise (starting from blank) until the differential pressure reached 5. The lowest concentration at which no blockage took place was considered as minimum inhibitor concentration (MIC).

The Standard Forties field condition, which has a severe barite (barium sulfate) scaling tendency was used here to evaluate the performance of scale inhibitors. Table 1 shows the concentration of different ions in a 50:50 mix of the formation water (Forties) and seawater.

TABLE 1

| Ion concentrations in Forties Field Conditions | |
|---|---|
| Ion | ppm |
| Na | 20130 |
| K | 416 |
| Mg | 936 |
| Ca | 1618.5 |
| Sr | 287 |
| Ba | 126 |
| HCO3 | 310 |
| SO4 | 1480 |

A series of dynamic scale loop tests have been conducted at 100° C. and 250 psi to assess the performance of scale inhibitors coded linear AA (Accusol™ 441 from The Dow Chemical Company having a molecular weight of 3500 g/mol) and a coded star AA (Poly(AA) star polymers made substantially as in Example 1 and having a molecular weight of 3300 g/mol, 6 linear arms with an average degree of polymerization of 6 in the arms) in preventing scale precipitation of brine water. The results are shown in FIG. 1. A blank was run with the untreated fluid and it was shown to have an average blank time to a differential pressure of 5 was determined to be approximately 7.5 min and so the scale inhibitor must resist scale deposition (determined to be a rise in differential pressure of 5 psi) for a period of 15 min (2 times the blank scale-up time) according to evaluation criteria. The performance linear AA polymer as a scale inhibitor compared to the blank is also shown. The initial concentration of the scale inhibitor is 50 ppm and every 15 minutes the concentration of the polymer decreased to the next lowest scale inhibitor concentration until differential pressure reaches 5 psi. As can be seen, the differential pressure reached 5 psi at around 23 minutes of run time translates to 40 ppm of scale inhibitor. The minimum scale inhibitor concentration (MIC) of the linear AA needed to prevent the formation of scale is 50 ppm. In contrast, the star AA polymer as a scale inhibitor was compared linear AA. The initial concentration of the scale inhibitor is 50 ppm and every 15 minutes the concentration of the polymer decreased to the next lowest scale inhibitor concentration until differential pressure reaches 5 psi. As can be seen in FIG. 1 the differential pressure reached 5 psi at around 125 minutes of run time translates to 3 ppm of scale inhibitor. The minimum scale inhibitor concentration (MIC) of the star AA needed to prevent the formation of scale is 5 ppm. The MIC of the of the scale inhibitor decreased by 10 times by changing the architecture of the acrylic acid from linear to star structure.

Example 3—Inhibition of Calcium Carbonate Scale

The test as in Example 2 was repeated but using The Standard Shearwater formation water, which has a severe calcium carbonate scaling tendency was used here to evaluate the performance of scale inhibitors. Table 2 shows the concentration of different ions in the Shearwater formation water.

TABLE 2

| Ion concentrations in Shearwater Field Conditions | |
|---|---|
| Ion | ppm |
| Na | 68000 |
| K | 4960 |
| Mg | 680 |
| Ca | 18960 |
| Sr | 1625 |
| Ba | 2340 |
| HCO3 | 560 |
| SO4 | 0 |

Figure 2:
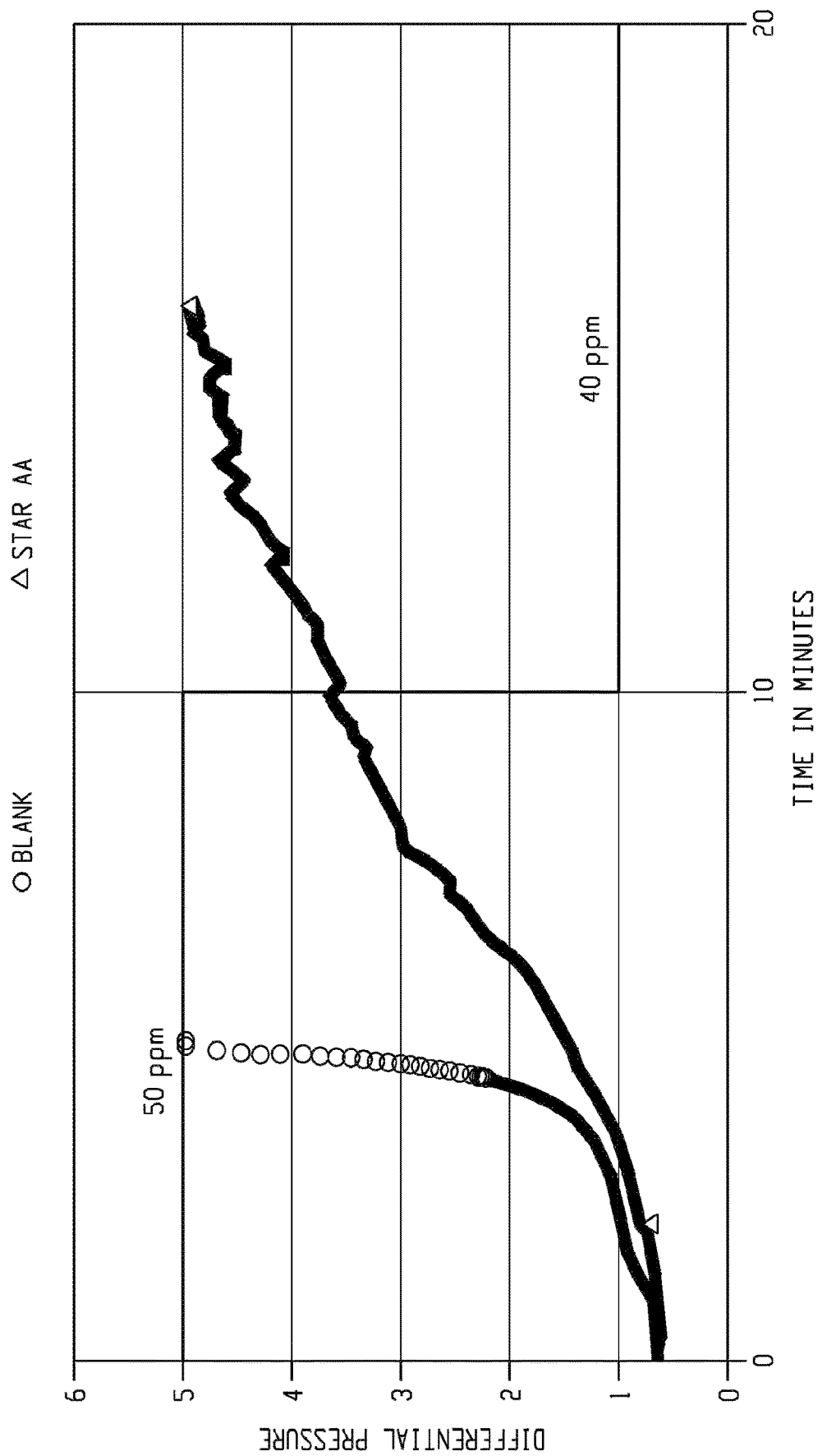
FIG. 2 is a graph showing the dynamic tube block test results for two comparative examples and for a star polymer as disclosed herein for standard Shearwater formation water.

As shown in FIG. 2, differential pressure versus time plot for blank test (without scale inhibitor) shows that, the average blank time was determined to be approximately 5 minutes and so the scale inhibitor must resist scale deposition (determined to be a rise in differential pressure of 5 psi) for a period of 10 minutes (2 times the blank scale-up time) according to evaluation criteria. Using the linear AA polymer as a calcium carbonate scale inhibitor compared to the blank. The initial concentration of the scale inhibitor is 50 ppm and every 10 minutes the concentration of the polymer decreased to the next lowest scale inhibitor concentration until differential pressure reaches 5 psi. FIG. 2 shows that the star polymer is effective in inhibiting Calcium carbonate scale formation.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). Moreover, stated upper and lower limits can be combined to form ranges (e.g. "at least 1 or at least 2 weight percent" and "up to 10 or 5 weight percent" can be combined as the ranges "1 to 10 weight percent", or "1 to 5 weight percent" or "2 to 10 weight percent" or "2 to 5 weight percent"). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Aryl" means an aromatic hydrocarbon group containing the specified number of carbon atoms, such as phenyl, tropone, indanyl, or naphthyl. "The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl) a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a $C_2$ alkyl group substituted with a nitrile.

What is claimed is:

1. A method of inhibiting scale formation comprising adding, to a fluid comprising an inorganic salt that can precipitate to form a scale, a scale inhibitor selected from the group consisting of polycarboxylic acids having a star structure having a core derived from 2,2'-[Oxybis(methylene)]bis[2-(hydroxymethyl)-1,3-propanediol] and at least 5 arms wherein the arms are formed from monomers selected from acrylic acid, methacrylic acid, butenoic acid, crotonic acid, itaconic acid, an itaconic acid monoester, fumaric acid, a fumaric acid monoester, maleic acids, a maleic acid monoester, or a combination thereof, a salt of such polycarboxylic acids, or combinations thereof.

2. The method of claim 1 wherein the number of arms is no more than 10.

3. The method of claim 1 wherein the polycarboxylic acid or salt thereof is characterized by an average degree of polymerization of the arms of from 2 to 15.

4. The method of claim 3 wherein the average degree of polymerization of the arms is 3 to 7.

5. The method of claim 1 wherein the number average molecular weight of the polycarboxylic acid or salt thereof is from 700 to 10,000 g/mol.

6. The method of claim 1 wherein the scale comprises barium sulfate.

7. The method of claim 1 wherein an amount of polycarboxylic acid or salt thereof added to the fluid is in the range of 1 to 100 ppm based on total weight of the fluid.

8. The method of claim 7 wherein the amount of polycarboxylic acid is 3 to 20 ppm.

9. The method of claim 1 wherein the polycarboxylic acid or salt or salt thereof is characterized by the presence of one or more unhydrolyzed —COO— groups.

10. The method of claim 9 wherein the unhydrolyzed —COO— group has the structure —COOR, where R in a hydrocarbyl group of up to 6 carbon atoms.

11. A method of inhibiting scale formation comprising adding, to a fluid comprising an inorganic salt that can precipitate to form a scale, a scale inhibitor selected from the group consisting of polycarboxylic acids having a star structure having a core and at least 5 arms, a salt of such polycarboxylic acids, or combinations thereof wherein the polycarboxylic acid or salt or salt thereof is characterized by the presence of one or more unhydrolyzed —COO— groups.

12. The method of claim 11 wherein the number of arms is no more than 10.

13. The method of claim 11 wherein the polycarboxylic acid or salt thereof is characterized by an average degree of polymerization of the arms of from 2 to 15.

14. The method of claim 13 wherein the average degree of polymerization of the arms is 3 to 7.

15. The method of claim 11 wherein the scale comprises barium sulfate.

16. The method of claim 11 wherein an amount of polycarboxylic acid or salt thereof added to the fluid is in the range of 1 to 100 ppm based on total weight of the fluid.

17. The method of claim 16 wherein the amount of polycarboxylic acid is 3 to 20 ppm.

18. The method of claim 11 wherein the number average molecular weight of the polycarboxylic acid or salt thereof is from 700 to 10,000 g/mol.

19. The method of claim 11 wherein the unhydrolyzed —COO— group has the structure —COOR, where R in a hydrocarbyl group of up to 6 carbon atoms.

* * * * *